3,743,611
FOAMABLE THERMOPLASTIC BEADS AND A
PROCESS FOR THE PREPARATION THEREOF
Tadashi Muroi, Yoshitaka Oguri, and Hidenori Hamaoka,
   Hitachi, Japan, assignors to Hitachi, Ltd., and Hitachi
   Chemical Company, Ltd., both of Tokyo, Japan
No Drawing. Continuation-in-part of application Ser. No.
   643,834, June 6, 1967. This application July 9, 1971,
   Ser. No. 161,935
   Claims priority, application Japan, June 8, 1966,
         41/36,511, 41/36,512
            Int. Cl. C08j 1/30
U.S. Cl. 260—2.5 B                              30 Claims

ABSTRACT OF THE DISCLOSURE

Thermofoamable thermoplastic beads consisting of a thermoplastic resin containing at least 5% by weight of an aliphatic olefin polymer, said beads being impregnated with a foaming agent which does not dissolve the resin at foaming temperatures and is gaseous or liquid at room temperature and normal pressure; for example, propane, n-pentane and the like.

CROSS-REFERENCES TO RELATED APPLICATIONS

This is a continuation-in-part of our copending application Ser. No. 643,834, filed June 6, 1967, now abandoned.

This invention relates to unique foamable thermoplastic beads which contain an aliphatic olefin polymer Foam materials which are prepared by polyfoaming a thermoplastic resin such as polystyrene, polyvinyl chloride, polyethylene and the like, according to suitable foaming means have been widely employed for heat insulators, lagging material, buoys, electric insulators, packing material, and the like. Among the various materials used to produce foam products is a bead-like thermoplastic material containing a foaming agent. This material is charged into a container of a desirable shape and foamed by heating. In this manner, foamed moldings can easily be prepared. Nowadays, polystyrene beads, impregnated with a foaming agent such as butane, pentane or petroleum ether, are foamed by this known process and are used on a large scale.

The present inventors have investigated foam manufactured from foamable polystyrene beads, and have found that such foam has undesirable properties for use as packing material. One of the undesirable properties is that polystyrene foam is permeable to water, and another is that this foam has relatively weak absorbing and damping abilities against impact loadings; in other words, it has low elasticity. Furthermore, this foam is so weak that it is broken by pushing with a nail. These characteristics of the foam are undesirable, especially for use as packing material.

Polyethylene foam is light, flexible and has good electrical and heat insulation as well as excellent chemical resistance. Many processes for manufacturing aliphatic olefin polymer foam, especially polyethylene foam, are known and are disclosed in U.S. Pats. Nos. 3,098,831 and 3,098,832, and Japanese patent publication Nos. 7,185/58, 8,195/58 and 17,288/61. In these processes, the steps comprise partially cross-linking polyethylene which contains a chemical foaming agent capable of generating gas under decomposition and thereafter extruding the polyethylene from a high pressure zone into a low pressure zone.

However, these known processes are practicable only for manufacturing foam in a simple form or shape, such as a plate or a film. Therefore, new techniques have been sought for manufacturing polyethylene foam in any desired moldings. Though a polyethylene hollow molding has recently been developed from the foamed molding of this aliphatic olefin polymer, the product is confined to hollow moldings only. Moreover, the degree of foaming is as low as 2–3 cc./g. and is therefore of low practical value.

On the other hand, the Japanese patent publication Nos. 25,351/65 and 25,352/65 describe a process for preparing foamed moldings which is characterized by forming pellets of polypropylene which are partially foamed by extruding and heating. According to this process, a partially foamed pellet is prepared by extruding the mixture of polypropylene, a foaming agent and a cross-linking agent at about 200° C. and heating the mixture above 200° C., to obtain a molding. This is substantially the same as the conventional process for preparing plate or film-like foamed moldings.

Although foamable thermoplastic beads suitable for the preparation of foamed moldings of an aliphatic olefin polymer are greatly in demand, as described above, satisfactory beads have not been available.

The first object of the present invention is to provide novel foamable thermoplastic beads. The second object of the present invention is to provide novel foamable thermoplastic beads, which comprise an aliphatic olefin polymer as the essential component and a suitable foaming agent and which can easily be molded to any desired shape, and a process for the preparation thereof. The third object of the present invention is to provide novel foamable thermoplastic beads having improved water resistance and increased elasticity. Another primary object of the present invention is to provide foamable thermoplastic beads containing an aliphatic olefin polymer, which have superior stability of preservation for the foaming agent, i.e., the beads are capable of retaining the foaming agent for prolonged periods.

The present invention thus contemplates a foamable composition containing an aliphatic olefin polymer which can be foamed by heating and which can be easily molded to form plate, or film-like foamed moldings and any other desired shape foamed moldings. More particularly, this invention is directed to thermoplastic beads containing said foamable polymer-containing composition. According to the present invention, thermoplastic beads are provided which can foam under heating and which comprise a thermoplastic resin containing at least 5% by weight of the aliphatic olefin polymer, and a foaming agent that does not dissolve the resin or polymer at the temperature required for foaming, that becomes attached to the resin at a temperature for storing the beads, for example, below 50° C. under approximately normal pressure, (i.e., shows good affinity for the resin) and that is fluid at room temperature and normal pressure, e.g., propane, butane, n-pentane, and the like.

Also, this invention concerns a foamable thermoplastic bead comprising a thermoplastic resin in the form of a bead, a liquid organic foaming agent impregnated within the bead, and an organic material for enhancing preservation of the foaming agent within said bead and for improving the foaming characteristics of the bead said thermoplastic resin comprising an aliphatic olefin polymer, said foaming agent having a boiling point below the softening point of the resin and acting as a non-solvent for the resin under the heating required for foaming, and said organic material being selected from the group consisting of another thermoplastic resin having an affinity for said foaming agent at a temperature for storing the beads, e.g. below 50° C., a solvent for the resin above room temperature, and a copolymerizable vinyl monomer and mixtures thereof.

The aliphatic olefin polymer suitable for the purposes of this invention thus can be 5% by weight to 100% by weight of the thermoplastic resin employed in the form of the foamable beads. For example, in case of using 5% by weight or more of polyethylene as the aliphatic olefin polymer and polystyrene as the residual or remaining portion of the thermoplastic resin, elasticity can be increased as compared with a foamed molding consisting of 100% by weight of polystyrene. Especially in case of employing 20% by weight or more of the aliphatic olefin polymer, it is possible to obtain a foamed molding of excellent elasticity and excellent solvent resistance.

Thus, it has been found that the elasticity of the foamed molding is increased by increasing the content of aliphatic olefin polymer. Although it is desirable in this respect that the content of aliphatic olefin polymer be as large as possible, the present inventors have further found that a bead of an aliphatic olefin polymer blended or added with other thermoplastic resins such as polystyrene and polybutadiene, has a higher impregnation and preservation ability for the foaming agent than a bead of 100% aliphatic olefin polymer. This effect becomes particularly remarkable in the case when 5% by weight or more of the other thermoplastic resin is used.

The usable aliphatic olefin polymers include the homopolymers or copolymers of ethylene, propylene, butene-1, pentene-1, 3-methyl butene-1, 4-methyl butene-1 4-methyl hexene-1, 5-methyl hexene-1, or the like; a mixture of the homopolymers and the copolymers; or a mixture of the copolymers. Although it is possible to obtain foamed moldings from these polymers which exhibit excellent water resistance, solvent resistance and elasticity, it is desirable for improvement of both the preservation (or retention) of the foaming agent within the beads and the mutual fusion adhesiveness of beads, that polystyrene, styrene-butadiene copolymer, butadiene-acrylonitrile copolymer, polyvinyl chloride, polyisobutylene, polybutadiene, chlorinated polyethylene, petroleum resin, vinyl acetate-ethylene copolymer and the like are blended with said olefinic polymers. The objects of this invention can also be achieved by polymerizing an aliphatic olefin polymer or a mixture of the polymer and the other thermoplastic resin with a copolymerizable vinyl monomer such as styrene, $\alpha$-methyl styrene, a nucleus-substituted methyl styrene, a nucleus-halogenated styrene, acrylonitrile, methyl methacrylate, vinyl chloride and the like, in the presence of a polymerization catalyst.

The suitable content of aliphatic olefin polymer is between 20 and 80% by weight, especially 30 and 70% by weight, of the thermoplastic resin portion of the bead. With this content, it is possible to obtain foamed moldings having well-balanced characteristics of water resistance, elasticity and solvent resistance.

To obtain foamable beads, the aliphatic olefin polymer individually or the mixture of the polymer and the other thermoplastic resin is dispersed in the form of beads or pellets in an aqueous medium by using a suitable suspending agent; and thereafter a foaming agent is introduced under pressure thereto and impregnated therein at the softening temperature of the thermoplastic resins. In this case, the impregnation of the foaming agent advantageously can be accelerated by the addition of the copolymerizable vinyl monomer. Such a copolymerizable vinyl monomer does not dissolve the aliphatic olefin polymer at about room temperature, but the aliphatic olefin polymer is dissolved or swollen in the vinyl monomer above a certain temperature, for example, at 70° C. or more in case of polyethylene. The temperature wherein the vinyl monomer shows the property or ability to dissolve the thermoplastic resins will be referred to as "the temperature of the solvent to show solubility." In case of introducing the foaming agent under pressure at the above temperature or more, the foaming agent can easily be impregnated into the resin (i.e., to the olefin polymer or mixture thereof with the other thermoplastic resin).

For example, in case of suspending the blended resin beads of polyethylene and polystyrene in an aqueous medium and thereto introducing a foaming agent under pressure, if styrene is employed as the vinyl monomer, it can act as a polymerizable vinyl monomer and also as a solvent. Therefore, according to the present invention, a solvent can also be used to improve the affinity of the beads for the foaming agent. The vinyl monomers may be employed alone or in combination. The usable solvent other than the vinyl monomer may be a chlorinated hydrocarbon, such as tetrachloroethylene, trichloroethylene, carbon tetrachloride, monochlorobenzene, and tetrachloroethane; benzene, xylene, toluene, carbon disulfide and the like. These solvents cannot dissolve but can slightly swell the aliphatic olefin polymer at normal temperature or less; whereas, these solvents can dissolve the polymer above "the temperature of the solvent to show solubility."

The present inventors have measured impregnation rates of the foaming agent at different temperatures by using the above-mentioned solvents. In consequence of the measurement, while the impregnation of a sufficient amount of the foaming agent to form foamed molding takes a long time under some conditions, it has been found that a sufficient amount of the foaming agent can be impregnated within a short time by introducing under pressure the foaming agent above "the temperature of the solvent to show solubility." The suitable amount of the solvent is varied with the kind thereof, but may generally be from 5–15% by weight based on the combined weight of the resin mixture.

Although it is significant, as described above, that the vinyl monomer is used not only as a solvent, but also as a constituent of the beads, there is no need to limit unduly the amount used, i.e., from 0 to 95% by weight of the vinyl monomer, based on the weight of the resin in the bead, can be used as the constituent (e.g., as the other thermoplastic resin) other than the aliphatic olefin polymer. Thus, in case of substantially uniform dispersion of the vinyl monomer in the aliphatic olefin polymer, the cell size, strength and fusion adhesiveness of the foamed molding are excellent.

When cross-linking is effected by using an organic peroxide cross-linking agent such as dicumyl peroxide; 2,5-dimethyl (2,5-di-t-butyl peroxy) hexene-3,2; $\alpha$-dimethyl-$\alpha$-methyl-$\alpha$-ethyl benzyl peroxide and the like, it is easier to prepare a foamed molding having a closed cell structure. That is, the aliphatic olefin polymers being different from styrene foamable polymers, show a special viscoelastic fluid state and therefore such polymers are likely to form a continuous foam. In other words, the aliphatic olefins polymer is of so high crystallinity that it exhibits little fluidity below its melting point, but becomes eminently fluid at its melting point or at higher temperatures. It is difficult to obtain excellent foamed molding because the temperature range suitable for the foaming is narrow in a resin of such fluid characteristics. Cross-linking is an effective means for widening of the narrow range noted above.

Electro beam radiation (ionization radiation) in addition to the application of the organic peroxide cross-linking agent may also be used to effect cross-linking of the polymer. However, the application of organic peroxide is inexpensive and of industrial value. In case of carrying out the cross-linking by means of electron beam radiation, it is advantageous to apply the electron beam radiation after a foaming agent is impregnated with the thermoplastic resin. As the impregnation of a foaming agent and the cross-linking are carried out at the same time when using the organic peroxide, the time of production can be shortened in comparison with a process which includes a prior cross-linking treatment or a cross-linking treatment after the mixing of the foaming agent. The suitable amount of the cross-linking agent to be used depends upon reaction conditions and required characteristics of the foamed moldings, but the amount chosen generally is between 0.5 to 1.5% by weight of the thermoplastic resin in the bead.

The ratio of cross-linking is determined according to the usage and purpose of the product foam so it cannot be decided directly but is preferablfy 5% or more. Especially excellent results are obtained at more than 10% cross-linking ratio, and the most ideal foamed molding is produced at a 15 to 40% cross-linking ratio. The cross-linking ratio can, for example, be obtained by measuring an amount of the insoluble component of the unit sample in boiling xylene.

From a practical point of view, it may be significant to decide or determine the size of the foamable thermoplastic beads. However, as it is difficult to prepare beads of regular shape and size; consequently, the size thereof can harly be decided accurately. For example, the beads may preferably be shaped as a pellet or a sphere, and it is desirable with respect to the cross section of the beads that the minor diameter of the smallest bead is 0.5 mm. and the minor diameter of the largest bead is 10 mm. Naturally, the major diameter of the beads may be larger than the above values. It has been found that when the minor diameters of the beads are, respectively, 1 mm. and 5 mm., an excellent foamed molding can be obtained.

In case of polymerizing thermoplastic beads with a vinyl monomer for the preparation of beads according to the present invention, a process such as suspension polymerization, solution polymerization and lump polymerization can be employed; suspension polymerization especially makes possible the prepartion of foamable beads directly suitable for molding material.

As hertofore explained, it is advantageous that the foamable thermoplastic beads according to the present invention are prepared by suspending an aliphatic olefin polymer alone or a resin mixture of the polymer and the other thermoplastic resin in an aqueous medium and introducing under pressure a foaming agent thereto, in the presence of a suspending agent such as polyvinyl alcohol and the like, in the presence or absence of a vinyl monomer, a polymerization catalyst and a cross-linking agent. That is, the foamable beads according to the present invention are advantageously manufactured by dispersion, in the presence of a suspending agent, a bead-like thermoplastic resin containing 5% by weight or more of the aliphatic olefin polymer and by impregnating a foaming agent into the said resin in the presence of the foaming agent, which agent can foam under heating without dissolving the resin, and has an affinity for the resin under approximately normal pressure at a temperature for storing the beads, e.g. 50° C. or less.

The aliphatic olefin polymer, for example, polyethylene, and the other thermoplastic resin, for example, polystyrene, are blended together at the ratio of 90:10 to 10:90, to prepare pellets thereof; the pellets are suspended in an aqueous medium, and the resulting suspension is heated at 130–150° C. in the presence of a foaming agent, so that the foaming agent can be impregnated into the resin mixture. Alternately, the blended pellets of polyethylene and polystyrene are prepared and dispersed in styrene monomer, a foaming agent is next impregnated and the styrene is polymerized under heating at 130° C. for 8 hours in the presence of the foaming agent, then the obtained liquid pellet dispersion is added to an additional styrene monomer and benzoyl peroxide, and the resulting mixture is heated at 80° C. for 12 hours.

For improving the impregnation and preservation of the foaming agent in the thermoplastic resin, it is further effective to introduce the foaming agent to the thermoplastic resin under pressure by means of an inert gas, such as nitrogen gas, carbonic acid gas, air, helium gas, and the like. The impregnation of the foaming agent in the presence of vinyl monomer, a solvent and a swelling agent, is also preferably carried out under the pressure of an inert gas. The pressurizing of inert gas may preferably be applied during the impregnation of the foaming agent or after the impregnation is almost completed. The pressure of inert gas is preferably higher than the total vapor pressure of aqueous medium, foaming agent, vinyl monomer, solvent, swelling agent and the like. For example, this object can sufficiently be achieved under a pressure of inert gas which is 1.1 times or higher than the inner pressure of the vessel before the introduction of the inert gas. The application of pressure prevents the foaming agent, once absorbed, from being scattered from the thermoplastic beads.

It will be understood that the scattering or dispersing of the foaming agent takes place not only during the storage of the beads, but also during the impregnation of the foaming agent and can very effectively be eliminated by the pressure of inert gas.

Thus, it is possible to prepare a foamable polymer of an aliphatic monoolefin or a novel or useful foamable thermoplastic bead containing said polymer. The beads thus obtained are, directly or after being prefoamed, charged in a desired die and heated, to obtain the foamed moldings of any desired shape.

In the conventional foamed moldings of an aliphatic olefin polymer, a chemical foaming agent which decomposes to produce $CO_2$ or $N_2$ when heating has generally been employed. For example, azobisdicarbonic amide decomposes at 195–200° C. and dinitrosopentamethylene tetramine decomposes at 195–205° C. According to the present invention, it is very advantageous that an excellent foamed molding can be obtained by heating at such low temperatures as about 100° C. which is much lower than in the said conventional processes because of physical foaming.

The following examples according to the present invention are given for the purpose of illustration only, and are to be considered as not limiting the invention. Parts in the following examples are all indicated by weight.

EXAMPLE 1

In a pressure vessel, 60 parts of Sumikasen G 202 pellet (low density polyethylene made by Sumitomo Kagaku Kogyo) were dispersed under stirring in 300 parts of water in which 0.6 part of GH–23 polyvinyl alcohol (polyvinyl alcohol made by Nippon Gosei Kagaku) were dissolved. Separately, 0.6 part of dicumyl peroxide was dissolved in 6 parts of xylene and was added to the suspension system. Further, 18 parts of butane was added to the system. Under 5 kg./cm.$^2$ pressure of nitrogen gas, the reaction was carried out at 125–130° C. for 10 hours to cross-link the polyethylene. The boiling xylene-insoluble part was 18% by weight.

By steam-heating of resultant beads which had been separated from the suspension system after cooling, the prefoamed beads having a foaming degree of 25 cc./g. were obtained. After the beads were air-dried, the beads were charged in a die and heated again by steam, to obtain an excellent foamed molding.

EXAMPLE 2

After the same treatment as in Example 1, the reaction was carried out at 90–95° C. for 15 hours, to obtain a foamed molding having a foaming degree or density of 20 cc./g. The boiling xylene-insoluble part was 6% by weight.

EXAMPLE 3

Beads were manufactured by carrying out the same treatment as in Example 1, except that 2,5-dimethyl (2,5-di-t-butyl peroxy) hexene-3 (critical temp.: 143° C., purity: 50%, made by Cabot Corp.) was used instead of dicumyl peroxide, to obtain a foamed molding having a foaming degree of 10 cc./g. The boiling xylene-insoluble part was 5% by weight.

EXAMPLE 4

As in Example 1, 100 parts of Sumikasen G 202, 10 parts of ethylene tetrachloride (solvent), 1 part of dicumyl peroxide and 15 parts of n-pentane were charged to an autoclave and reaction of the mixture was carried out under agitation at 150° C. for 8 hours and further at 110° C. for 5 hours. The boiling xylene-insoluble part was 43% by weight.

The uniform solid product obtained after cooling was crushed to pieces of 0.5–1 mm. in diameter. A foamed molding having a foaming degree of 7 cc./g. was obtained by heating said particles with steam.

EXAMPLE 5

In an autoclave, 60 parts of pellet-like polypropylene were dispersed under stirring in 300 parts of water dissolving 0.8 part of GH–23 polyvinyl alcohol. One part of dicumyl peroxide, 6 parts of ethylene tetrachloride and 15 parts of butane were added to the dispersion and the resulting mixture was pressurized to 5 kg./cm.$^2$ with nitrogen gas and the reaction was carried out at 125–130° C. for 10 hours and further at 160° C. for 2 hours. Foamed beads having a foaming degree of 15 cc./g., were obtained by steam-heating. The boiling xylene-insoluble part was 48% by weight.

EXAMPLE 6

The polymer mixture of 80% by weight Sumikasen G 202 and 20% by weight polybutadiene was used instead of Sumikasen G 202, and other procedures were carried out in the same manner as in Example 1, to obtain foamable beads having a foaming degree of 15 cc./g. The boiling xylene-insoluble part was 15% by weight.

EXAMPLE 7

Sixty parts of beads of about 2 mm. in diameter which had been prepared by blending 90 parts of Sumikasen G 202 with 10 parts of polystyrene having a molecular weight of about 180,000 with an extruder and 500 parts of an aqueous solution of 0.2% concentrated GH–23 polyvinyl alcohol were charged in an autoclave and the beads were dispersed under stirring in the aqueous solution. To this solution were added 9 parts of styrene in which 0.09 part of benzoyl peroxide and 0.6 part of dicumyl peroxide were dissolved. Then, 15 parts of butane were introduced under pressure. After the secondary pressure of nitrogen gas was applied up to 5 kg./cm.$^2$, the reaction was carried out at 125–130° C. for 8 hours. Then, upon being cooled, the obtained beads were taken out. The boiling xylene-insoluble part was 46% by weight. By heating the beads in boiling water, foamed beads having a foaming degree of 35 cc./g. were obtained. Further, after the foamed beads were air-dried, the beads were charged in a die and heated again with steam, to obtain an excellent foamed molding.

This foamed molding was insoluble in benzene, toluene, and other organic solvents, thereby showing excellent resistance to chemicals. Further, it is of high elasticity as compared with polystyrene foamed moldings and therefore is suitable for packing material. Because of high heat insulation, it is also suitable for heat insulation.

EXAMPLE 8

In an autoclave, 60 parts of Sumikasen G 202 pellet and 500 parts of an aqueous solution of 0.2% concentrated G–23 polyvinyl alcohol were charged and stirred. Thereto, 9 parts of styrene containing 0.09 part of benzoyl peroxide were added, and the mixture was kept at 100° C. for 8 hours. Further, 9 parts of styrene containing 0.09 part of dicumyl peroxide was added and the mixture kept at 100° C. for 8 hours. Furthermore, 9 parts of styrene containing 0.6 part of dissolved dicumyl peroxide and 0.9 part of dissolved benzoyl peroxide, and 15 parts of butane were added. This mixture was then subjected to a 5 kg./cm.$^2$ secondary pressure of nitrogen gas and kept at 100–110° C. for 6 hours. The boiling xylene-insoluble part was 27% by weight. By steam-heating the beads separated from the suspension system after cooling, foamed beads having a foaming degree of 20 cc./g. were obtained. The foamed beads were charged in a die and heated again with steam, to obtain an excellent foamed molding.

EXAMPLE 9

In an autoclave, 60 parts of Sumikasen G 202, 9 parts of styrene containing 0.9 part of dissolved dicumyl peroxide and 0.09 part of dissolved benzoyl peroxide were charged with 15 parts of butane, and kept under stirring at 130° C. for 8 hours at 110° C. for 10 hours. The boiling xylene-insoluble part was 43% by weight.

The uniform solid product obtained after being cooled was crushed to pieces of about 0.5–1 mm. in the particle diameter. The particles were heated in boiling water, to obtain a foamed molding having a foaming degree of 10 cc./g.

EXAMPLE 10

The same procedures as in Example 7 were followed, except that a blend mixture of 90 parts of Sumikasen G 202 and 10 parts of non-crystalline polypropylene was used instead of the mixture of Sumikasen G 202 and polystyrene, to obtain foamed beads having a foaming degree of 15 cc./g. The boiling xylene-insoluble part was 5% by weight. Further, by charging the beads in a die and heating them with steam, an excellent foamed molding was obtained.

EXAMPLE 11

The same procedures as in Example 7, except using polypropylene pellets, were carried out, to obtain foamed beads having a foaming degree of 10 cc./g. The boiling xylene-insoluble part was 8% by weight.

EXAMPLE 12

The same procedures as in Example 7 were followed, except that the vinyl monomer was replaced by the mixture of 6 parts of styrene and 3 parts of acrylonitrile. An excellent foamed molding having a foaming degree of 15 cc./g. was obtained. The boiling xylene-insoluble part was 33% by weight.

EXAMPLE 13

The same procedures as in Example 7 were followed, except that trichloromethane was used instead of butane, to obtain foamed beads having a foaming degree of 50 cc./g. The boiling xylene-insoluble part was 40% by weight.

EXAMPLE 14

Sixty parts of beads, which have a diameter of 0.5 to 1.0 millimeter and which were prepared by blending 80 parts of Sumikasen G 202 with 20 parts of polystyrene and 500 parts of a 0.2% aqueous solution of GH–23 polyvinyl alcohol were charged into an autoclave, followed by introducing 15 parts of butane under pressure while stirring, and then a secondary pressure of nitrogen gas was applied up to 5 kg./cm.$^2$. The autoclave was maintained at 130° C. for 8 hours, and foamed beads having a foaming degree of 30 cc./g. were obtained after steam-heating. The boiling xylene-insoluble part was 36% by weight.

EXAMPLE 15

The same procedures as in Example 7 were conducted, except that in place of the 15 parts of butane, 10 parts of trichloromethane and 10 parts of SF$_6$ (foaming agent) were used. The foamed beads obtained had a foaming degree of 40 cc./g. The boiling xylene-insoluble part was 38% by weight.

EXAMPLE 16

The same procedures as in Example 7 were conducted, except that in place of 15 parts of butane, 15 parts of petroleum hydrocarbons of the B.P. 30°–50° C. fraction and the B.P. 50°–70° C. fraction were used, respectively. When the B.P. 30°–50° C. fraction was used, the boiling xylene-insoluble part was 25% by weight and when the B.P. 50°–70° C. fraction was used the boiling xylene-insoluble part was 28% by weight. The foamed beads obtained had, respectively, foaming degrees of 40 cc./g. and 20 cc./g.

EXAMPLE 17

The same procedures as in Example 7 were conducted, except that in place of the mixture of Sumikasen G 202 and polystyrene, a mixture of 80% by weight of Sumikasen G 202, 10% of Picolite (Mobil Oil, a petroleum resin, which is obtained as a byproduct of petroleum refinning) and 10% of polystyrene was used. The foamed beads obtained had a foaming degree of 30 cc./g. The boiling xylene-insoluble part was 15% by weight.

EXAMPLE 18

The same procedures as in Example 7 were conducted, except that in lieu of the mixture of Sumikasen G 202 and polystyrene, a mixture of 90% by weight of Sumikasen G 202 and 10% of polyisobutylene was used. The foamed beads obtained had a foaming degree of 20 cc./gram. The boiling xylene-insoluble part was 17% by weight.

EXAMPLE 19

The same procedures as in Example 7 were conducted, except that in place of the mixture of Sumikasen G 202 and polystyrene, a mixture of 70% by weight of Sumikasen G 202 and 30% of vinyl acetate-ethylene copolymer was used. The foamed beads obtained had a foaming degree of 20 cc.%g. The boiling xylene-insoluble part was 30% by weight.

EXAMPLE 30

The same procedures as in Example 7 were conducted, except that instead of the mixture of Sumikasen G 202 and polystyrene, a mixture of 10% by weight of Sumikasen G 202 and 90% of polystyrene was used. The foamed beads obtained had a foaming degree of 50 cc./g. The boiling xylene-insoluble part was 18% by weight.

EXAMPLE 21

The same procedures as in Example 7 were conducted, except that instead of the mixture of Sumikasen G 202 and polystyrene, a mixture of 87% by weight of Sumikasen G 202, 10% of polystyrene and 3% of citric acid was used. The foamed beads obtained had a foaming degree of 30 cc./g. The boiling xylene-insoluble part was 32% by weight.

From the above examples, it will be observed that the foaming agents suitable for the purposes of this invention include aliphatic hydrocarbons having at least 3 carbon atoms (and usually not more than 8 carbon atoms), petroleum ether, polyhalogenated hydrocarbons, e.g., ethylene tetrachloride, trichloromethane, etc., and mixtures thereof. It will be appreciated that these solvents have boiling points below the softening point of the resin constituent forming the bead, thereby allowing the beads to be impregnated at temperatures near the softening point without loss of the foaming agent. Also the beads impregnated with these agents can be prefoamed without softening and thereby adhering to each other. Also the amount of foaming agent impregnated into the foamable thermoplastic bead may vary depending on the density of the foam desired. In general, the foaming agent comprises from about 5% to 30% by weight of the foamable thermoplastic bead. Moreover, because the foaming agents are retained in the beads of this invention, the beads may be stored for several days and still provide a molding having an excellent foam structure.

What we claim is:

1. A foamable thermoplastic bead comprising a thermoplastic resin in the form of a bead, a liquid organic foaming agent impregnated within said bead, and an organic material for enhancing preservation of the foaming agent within said bead and for improving the foaming characteristics thereof; said thermoplastic resin comprising an aliphatic monoolefin polymer, said foaming agent having a boiling point below the softening point of said resin and acting as a non-solvent for the resin under the heating required for foaming, and said organic material being selected from the group consisting of another thermoplastic resin having an affinity for said foaming agent at temperatures for storing the beads, a solvent for the resin at temperatures above room temperature, a copolymerizable vinyl monomer, and mixtures thereof, said aliphatic monoolefin polymer being at least 5% cross-linked, based on the insolubility of the polymer in boiling xylene.

2. The foamable thermoplastic bead of claim 1 in which at least 5% by weight of the monoolefin polymer is cross-linked, based on the insolubility of the polymer in boiling xylene.

3. The foamable thermoplastic bead of claim 1 in which the foaming agent comprises from about 5 to 30% by weight of the bead.

4. The foamable thermoplastic bead of claim 1 in which said solvent comprises from about 5 to 15% by weight of the total weight of the resin in said bead.

5. A foamable thermoplastic bead comprising a thermoplastic resin in the form of a bead, a liquid organic foaming agent impregnated within said bead, and an organic material for enhancing preservation of the foaming agent within the bead and for improving the foaming characteristics thereof; said thermoplastic resin comprising at least 5% by weight of an aliphatic monoolefin polymer which is at least 5% cross-linked, based on the insolubility of the polymer in boiling xylene, said foaming agent having a boiling point lower than the softening point of the thermoplastic resin and being a substantially non-solvent for the thermoplastic resin at the temperature at which the bead is formed, said organic material being selected from the group consisting of an organic solvent for said resin and a copolymerizable vinyl monomer when the thermoplastic resin consists of 100% by weight of said aliphatic monoolefin polymer and said organic material comprising a thermoplastic resin other than said aliphatic monoolefin polymer which has an affinity for said forming agent at temperatures below 50° C.

6. The foamable thermoplastic bead of claim 5 in which the thermoplastic resin consists of 5 to 95% by weight of the aliphatic monoolefin polymer and a balance of said other thermoplastic resin.

7. The foamable thermoplastic bead of claim 5 in which the thermoplastic resin contains 30 to 70% by weight of said aliphatic monoolefin polymer.

8. The foamable thermoplastic bead of claim 5 in which the foaming agent is selected from the group consisting of aliphatic hydrocarbons having at least 3 carbon atoms, petroleum ether, polyhalogenated hydrocarbons, and mixtures thereof.

9. The foamable thermoplastic bead of claim 5 in which the aliphatic monoolefin polymer is at least 10% cross-linked, based on the insolubility of the polymer in boiling xylene.

10. The foamable thermoplastic bead of claim 5 in which the aliphatic monoolefin polymer is 15 to 40% cross-linked, based on the insolubility of the polymer in boiling xylene.

11. The foamable thermoplastic bead of claim 5 in which the aliphatic monoolefin polymer comprises a polymer of a monomer selected from the group consisting of ethylene, propylene, butene-1, pentene-1, 3-methylbutene-1, 4-methylbutene-1, 4-methylhexene-1, and 5-methylhexene-1.

12. The foamable thermoplastic bead of claim 5 in which said aliphatic monoolefin polymer is polyethylene.

13. The foamable thermoplastic bead of claim 5 in which the aliphatic monoolefin polymer is polypropylene.

14. The foamable thermoplastic bead of claim 5 in which said other thermoplastic resin is selected from the group consisting of polystyrene, styrenebutadiene copolymer, butadiene-acrylonitrile copolymer, polyvinyl chloride, polyisobutylene, polybutadiene, chlorinated polyethylene, petroleum resin, and vinyl-acetate-ethylene copolymer.

15. The foamable thermoplastic bead of claim 5 in which said vinyl monomer is selected from the group consisting of styrene, α-methyl styrene, nuclear methyl styrene, nuclear-halogenated styrene, acrylonitrile, methyl methacrylate, vinyl chloride, and vinyl acetate.

16. The foamable thermoplastic bead of claim 5 in which said other thermoplastic resin is polystyrene.

17. A foamable thermoplastic bead comprising an aliphatic monoolefin polymer that is at least 5% cross-linked, based on the insolubility of the polymer in boiling xylene, and a liquid organic foaming agent selected from the group consisting of organic liquids having a boiling point lower than the softening point of the olefin polymer and in which the olefin polymer is substantially insoluble at the temperature at which the bead is formed, and a solvent for the polymer, said solvent enhancing preservation of the foaming agent in said polymer and improving the foaming characteristics thereof.

18. The foamable thermoplastic bead of claim 17 in which the olefin polymer is from 15 to 40% by weight cross-linked.

19. The foamable thermoplastic bead of claim 17 in which the monoolefin polymer is selected from the group consisting of polymers of ethylene, propylene, butene-1, pentene-1, 3-methylbutene-1, 4-methylbutene-1, 4-methylhexene-1, and 5-methylhexene-1.

20. The foamable thermoplastic bead of claim 17 in which the solvent comprises from about 5 to 15% by weight of the polymer.

21. The foamable thermoplastic bead of claim 17 in which said foaming agent comprises from about 5 to 30% by weight of the bead.

22. A process for preparing a foamable thermoplastic bead which comprises dispersing thermoplastic resin beads formed from an aliphatic monoolefin polymer in an aqueous medium in the presence of a suspending agent, a liquid organic foaming agent, an organic material for enhancing preservation of the foaming agent in the beads and for improving the foaming characteristics thereof and a cross-linking agent for the aliphatic monoolefin polymer; and impregnating the foaming agent into said beads and cross-linking said aliphatic monoolefin polymer by heating the aqueous medium and said beads to a temperature above the softening point of the resin, said foaming agent having a boiling point lower than the softening point of the thermoplastic beads and being a non-solvent at the temperature at which the bead is impregnated.

23. The process of claim 22 in which the organic material is selected from the group consisting of another thermoplastic resin having an affinity for said foaming agent at a temperature for storing beads, a solvent for the resin at temperatures above room temperature, a copolymerizable vinyl monomer, and combinations thereof.

24. The process of claim 23 in which said aqueous medium also contains a cross-linking agent.

25. The process of claim 23 in which said aqueous medium contains said vinyl monomer and a polymerization catalyst whereby said monomer is polymerized.

26. The process of claim 23 in which impregnation of said foaming agent into the beads is effected under pressure of an inert gas.

27. A process for preparing formable thermoplastic beads suitable for forming a cellular article possessing uniformly small cells, increased water resistance and improved elasticity which comprises dispersing aliphatic monoolefin polymer beads and a polymerizable vinyl monomer in an amount of less than about 70% by weight of the beads in an aqueous medium, the vinyl monomer containing a predetermined amount of a polymerizing catalyst and a cross-linking agent for the olefin polymer; introducing a foaming agent selected from the group consisting of aliphatic hydrocarbons, petroleum ether, halogenated hydrocarbons and mixtures thereof having a boiling point lower than the softening point of the olefin polymer; heating the reaction system to a temperature wherein the olefin polymer becomes at least partially soluble in the vinyl monomer in order to impregnate the foaming agent into said polymer, to polymerize the vinyl monomer, and to cross-link said aliphatic monoolefin polymer, said vinyl monomers also enhancing preservation of the foaming agent in said beads; and separating the resulting beads from the aqueous medium.

28. A process for preparing foamable thermoplastic beads suitable for forming a cellular article possessing uniformly small cells, increased water resistance and improved elasticity, which comprises dispersing aliphatic monoolefin polymer beads and a small amount of a solvent for the olefin polymer in an aqueous medium, the solvent containing a cross-linking agent for the olefin polymer; introducing a foaming agent selected from the group consisting of aliphatic hydrocarbons, petroleum ether, halogenated hydrocarbons and combination thereof having a boiling point lower than the softening point of the olefin polymer; heating the reaction system to such a temperature that the solvent shows solubility to the olefin polymer in order to impregnate the polymer with the foaming agent and to cross-link said aliphatic monoolefin polymer, said solvent enhancing preservation of the foaming agent within said beads; and separating the resulting beads from the aqueous medium.

29. The process of claim 28 in which the beads also contain a thermoplastic resin having affinity to the foaming agent in an amount of from 20 to 95% by weight.

30. The process of claim 28 in which impregnation of the foaming agent into said beads is enhanced by the pressure of an inert gas.

References Cited
UNITED STATES PATENTS

| | | | |
|---|---|---|---|
| 2,983,692 | 5/1961 | D'Alelio | 260—2.5 B |
| 2,857,339 | 10/1958 | Colwell | 260—2.5 B |
| 3,098,831 | 7/1963 | Carr | 260—2.5 R |
| 3,001,954 | 9/1961 | Buchholtz | 260—2.5 B |
| 3,259,595 | 7/1966 | Wright | 260—2.5 B |
| 3,370,022 | 7/1968 | Ingram | 260—2.5 B |

JOHN C. BLEUTGE, Primary Examiner

M. FOELAK, Assistant Examiner

U.S. Cl. X.R.

260—33.6 PQ, 33.6 UA, 33.8 UA, 878 R, 888, 889, 896, 897 C, 897 A, 897 R